US007922142B2

(12) United States Patent
Koutsky et al.

(10) Patent No.: US 7,922,142 B2
(45) Date of Patent: Apr. 12, 2011

(54) VEHICLE SEAT SUSPENSION WITH STABILIZED ISOLATOR

(75) Inventors: L. John Koutsky, Milan, IL (US); Cole T. Brodersen, Davenport, IA (US)

(73) Assignee: Sears Manufacturing Co., Davenport, IA (US)

( * ) Notice: Subject to any disclaimer, the term of this patent is extended or adjusted under 35 U.S.C. 154(b) by 1075 days.

(21) Appl. No.: 10/879,945

(22) Filed: Jun. 28, 2004

(65) Prior Publication Data

US 2005/0285006 A1    Dec. 29, 2005

(51) Int. Cl.
*F16M 13/00* (2006.01)

(52) U.S. Cl. ........ 248/424; 248/429; 248/430; 248/636; 297/344.16; 297/344.1

(58) Field of Classification Search .................. 248/424, 248/419, 421, 429, 562, 566, 636, 430, 420; 297/344.13, 344.15, 344.16, 344.17, 344.1, 297/344.11, 340, 311
See application file for complete search history.

(56) References Cited

U.S. PATENT DOCUMENTS

| | | | | |
|---|---|---|---|---|
| 3,100,617 A | * | 8/1963 | Radke et al. | 248/430 |
| 4,183,493 A | * | 1/1980 | Koutsky | 248/430 |
| 4,344,597 A | * | 8/1982 | Eimen | 248/561 |
| 4,387,927 A | | 6/1983 | Fahey | |
| 4,477,050 A | * | 10/1984 | Thompson et al. | 248/636 |
| 4,856,763 A | * | 8/1989 | Brodersen et al. | 267/131 |
| 5,584,460 A | * | 12/1996 | Ropp | 248/423 |
| 5,720,462 A | * | 2/1998 | Brodersen | 248/425 |
| 5,799,922 A | | 9/1998 | Timms et al. | |
| 5,938,340 A | * | 8/1999 | Brodersen | 384/40 |
| 6,105,920 A | * | 8/2000 | Gauger | 248/429 |
| 6,200,032 B1 | | 3/2001 | Ropp | |
| 6,957,853 B2 | * | 10/2005 | Williams et al. | 297/93 |
| 7,044,553 B2 | * | 5/2006 | Ropp | 297/344.15 |
| 7,669,823 B2 | * | 3/2010 | Brodersen | 248/421 |
| 2003/0106981 A1 | | 6/2003 | Ropp | |

FOREIGN PATENT DOCUMENTS

WO    WO2004/074735 A1    9/2004

OTHER PUBLICATIONS

British Search Report, Jun. 13, 2005.

* cited by examiner

*Primary Examiner* — Terrell Mckinnon
*Assistant Examiner* — Todd M. Epps
(74) *Attorney, Agent, or Firm* — Lane & Waterman LLP

(57) ABSTRACT

In accord with the present invention, a vehicle seat suspension apparatus is provided comprising: a seat suspension base; an isolator plate disposes above the base and adapted to support a vehicle seat; means for allowing reciprocating horizontal movement of the isolator plate relative to the base; an elongated guide mounted to one of either the base or the isolator and oriented along the travel path of the isolator; and a guide engaging member mounted to the other of the base or the isolator and engaging the guide to stabilize the isolator as it moves along its travel path.

7 Claims, 4 Drawing Sheets

US 7,922,142 B2

VEHICLE SEAT SUSPENSION WITH STABILIZED ISOLATOR

BACKGROUND OF THE INVENTION

The present invention is directed generally to vehicle seating. More particularly, the invention is directed to a vehicle seat suspension using an isolator system that is stabilized to enhance seat suspension performance.

It is now common in vehicle seat technology to provide mechanisms or systems that reduce the undesirable effects of forces inputted to the seat from the front, back or sides. These so called "isolators," both "fore and aft" and "lateral" varieties, commonly have an isolator plate with side tracks that travel in a reciprocal manner on a set of rollers. These conventional isolators, however, suffer from certain disadvantages. Because of dimensional and tolerance constraints, these prior art isolator systems have a tendency to cant or "rack," increasing the interference and friction between the tracks and rollers. In addition, when the vehicle is on uneven terrain, which is often the case with off-the-road vehicles, the isolator tracks may bear against the sides of rollers, again generating undesirable interference and friction. Either or both of these problems can reduce the useful life of the suspension or require repair. Finally, the prior art isolators may cause a perceived "looseness" in the seat ride which is undesirable to the occupant.

SUMMARY OF THE INVENTION

The present invention is directed to a vehicle seat suspension having a stabilized or guided isolator system that overcomes the disadvantages of the prior art. Moreover, the present invention provides enhanced isolator performance in a mechanically simple, reliable and inexpensive design.

In accord with the present invention, a vehicle seat suspension apparatus is provided comprising: a seat suspension base; an isolator plate disposes above the base and adapted to support a vehicle seat; means for allowing reciprocating horizontal movement of the isolator plate relative to the base; an elongated guide mounted to one of either the base or the isolator and oriented along the travel path of the isolator; and a guide engaging member mounted to the other of the base or the isolator and engaging the guide to stabilize the isolator as it moves along its travel path.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENTS

Figure 1:
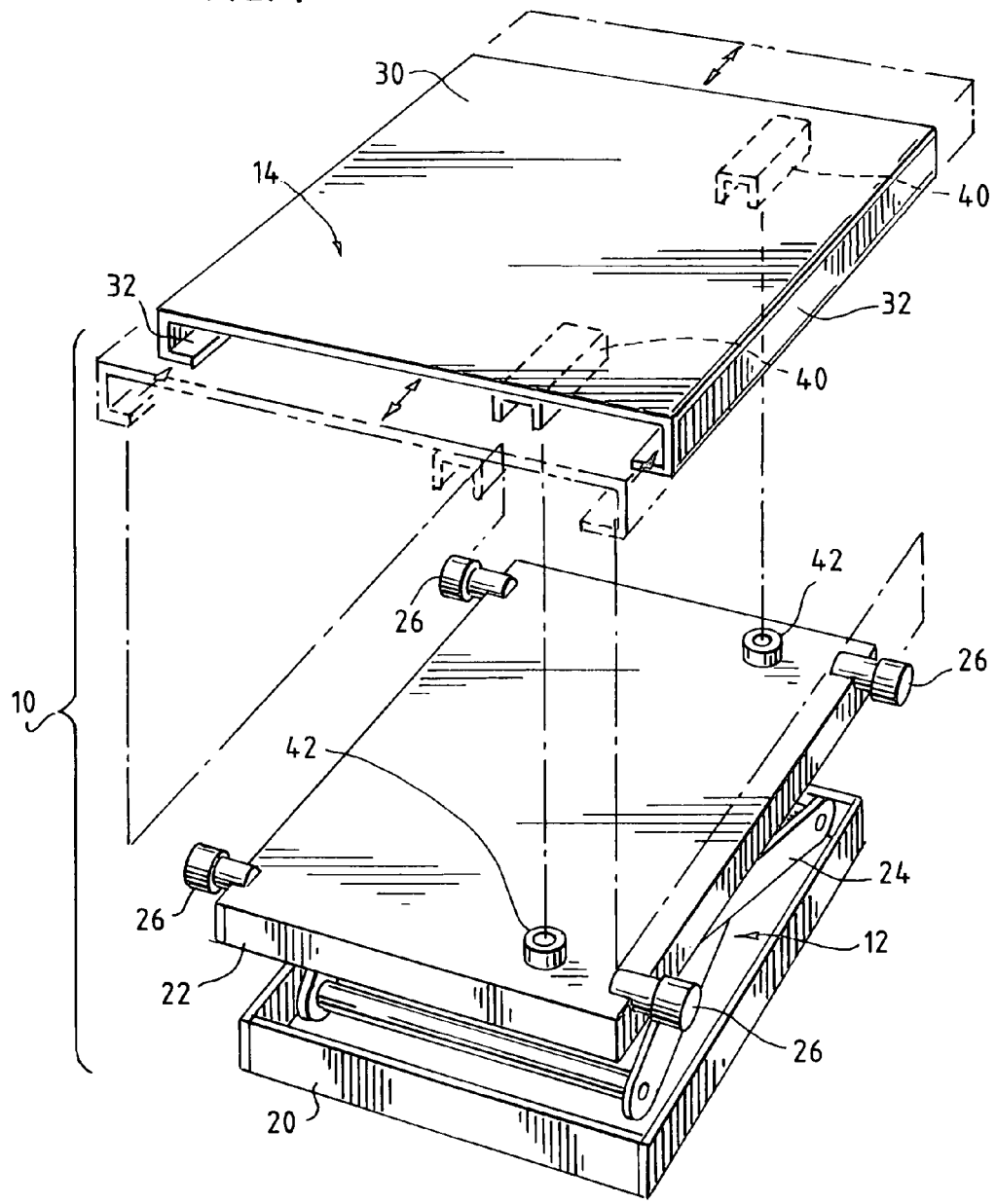
FIG. 1 is an exploded, perspective view of one preferred embodiment of the present invention.
Figure 2:
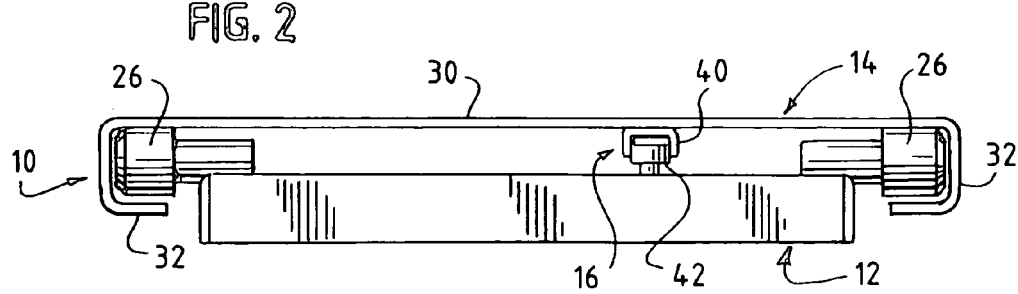
FIG. 2 is a front elevation view of the embodiment of the invention shown in FIG. 1.

With reference to FIGS. 1 and 2, the improved seat suspension of the present invention is designated generally as 10, and includes a base 12, an isolator 14 and a stabilizing system 16.

The base 12 may be any form of support allowing assembly of the vehicle seat to a vehicle. In the illustrated embodiment, the base 10 comprises a conventional scissors suspension having a lower housing 20 and an upper housing 22. The upper housing moves vertically relative to the lower housing and is joined to the lower housing via a scissors linkage 24. The base 12 also includes a set of rollers 26 which extend laterally from the sides of the upper housing 22.

The isolator 14 comprises an isolator plate 30 having side tracks 32 which cooperate with the rollers 26 to permit the isolator plate 30 to move reciprocally relative to base 12. Other mechanical arrangements will be apparent to those of ordinary skill in the art to facilitate movement of the isolator. For example, rollers may be associated with the isolator plate 30 and the cooperating tracks may be formed as part of, or affixed to, the sides of the upper housing 22. Likewise, structures such as tracks, bars, rails or flanges may be used in combination with rollers, slide blocks, journals or slide pads may.

The stabilizing system 16 illustrated in FIGS. 1 and 2 comprises at least one and preferably two channels 40 mounted to the isolator plate 30, and two rollers mounted to base 12, one roller 42 disposed within each channel 40. Alternatively the channels 40 may be mounted to the base 12 and rollers 42 may be mounted to the isolator plate 30. Thus, in this illustrated embodiment the guide or stabilizer is comprised of the two channels 40, and the guide engaging member is comprised of the rollers 42.

Figure 3:
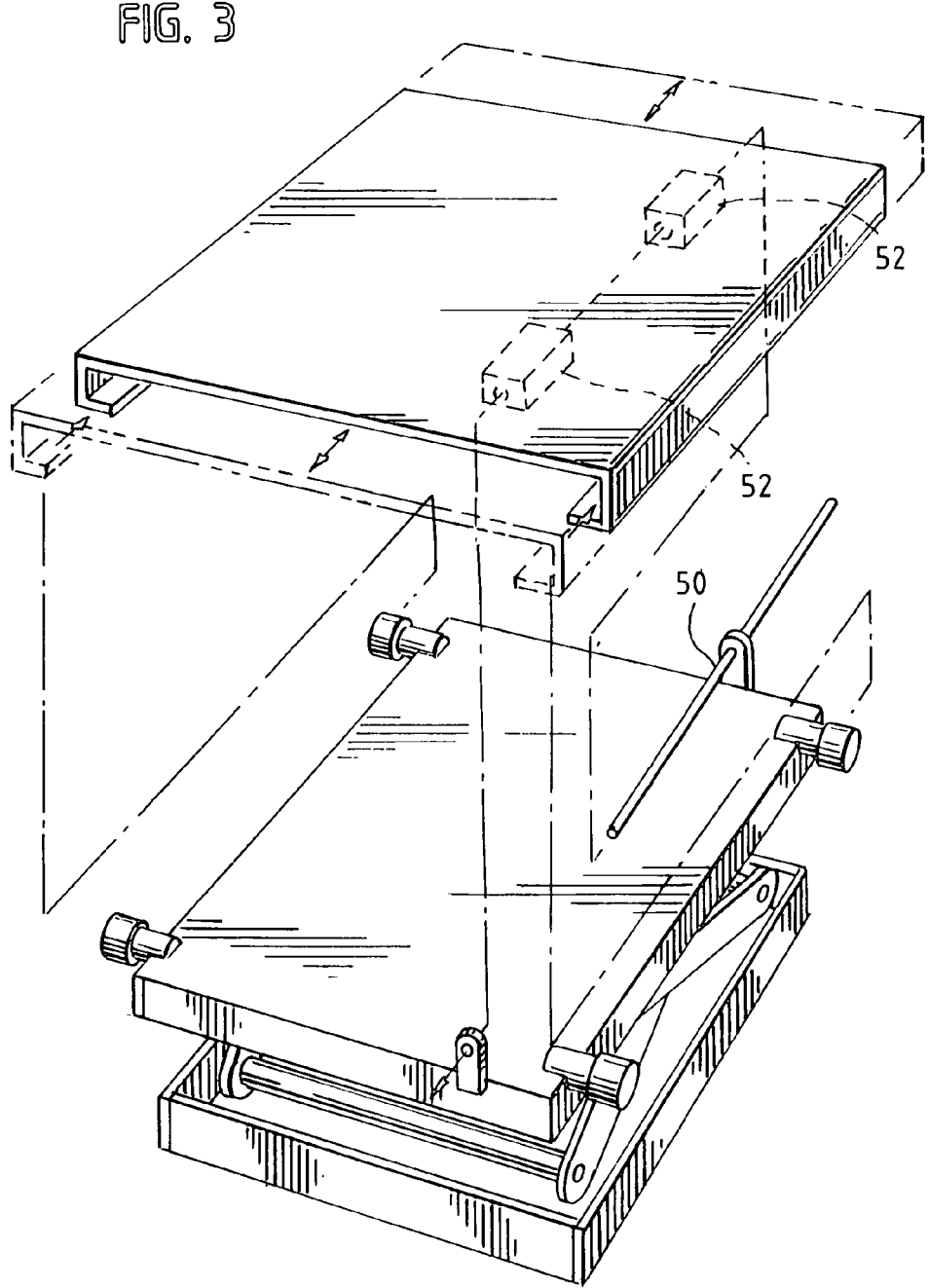
FIGS. 3 AND 4, 5 and 6, and 7 and 8 are, respectively, exploded perspective views and front elevation views, illustrating three other embodiments of the invention.
Figure 4:
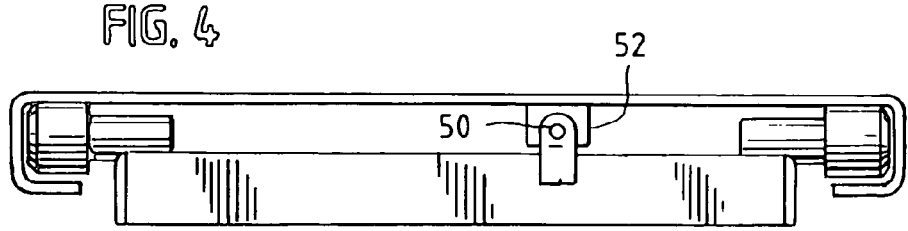

FIGS. 3 and 4 illustrate another embodiment where the guide comprises an elongated rod 50 and the guide engaging member comprises a pair of journal blocks 52.

Figure 5:
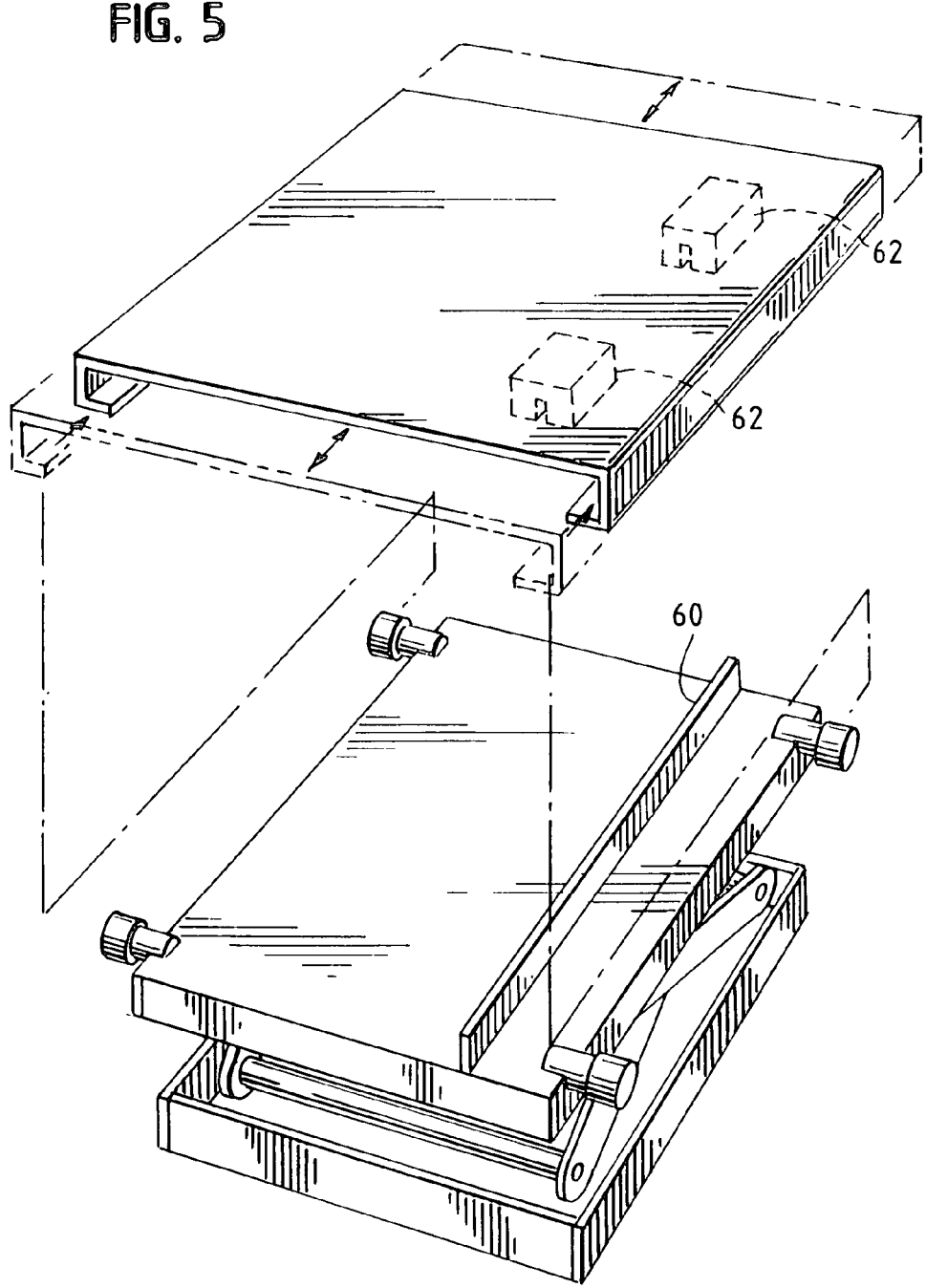
Figure 6:
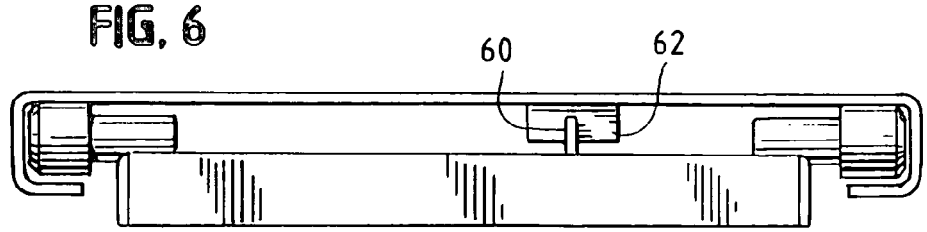

FIGS. 5 and 6 illustrate still another embodiment where the guide comprises an upstanding track 60 and the guide engaging member comprises a pair of slotted slide blocks 62.

Figure 7:
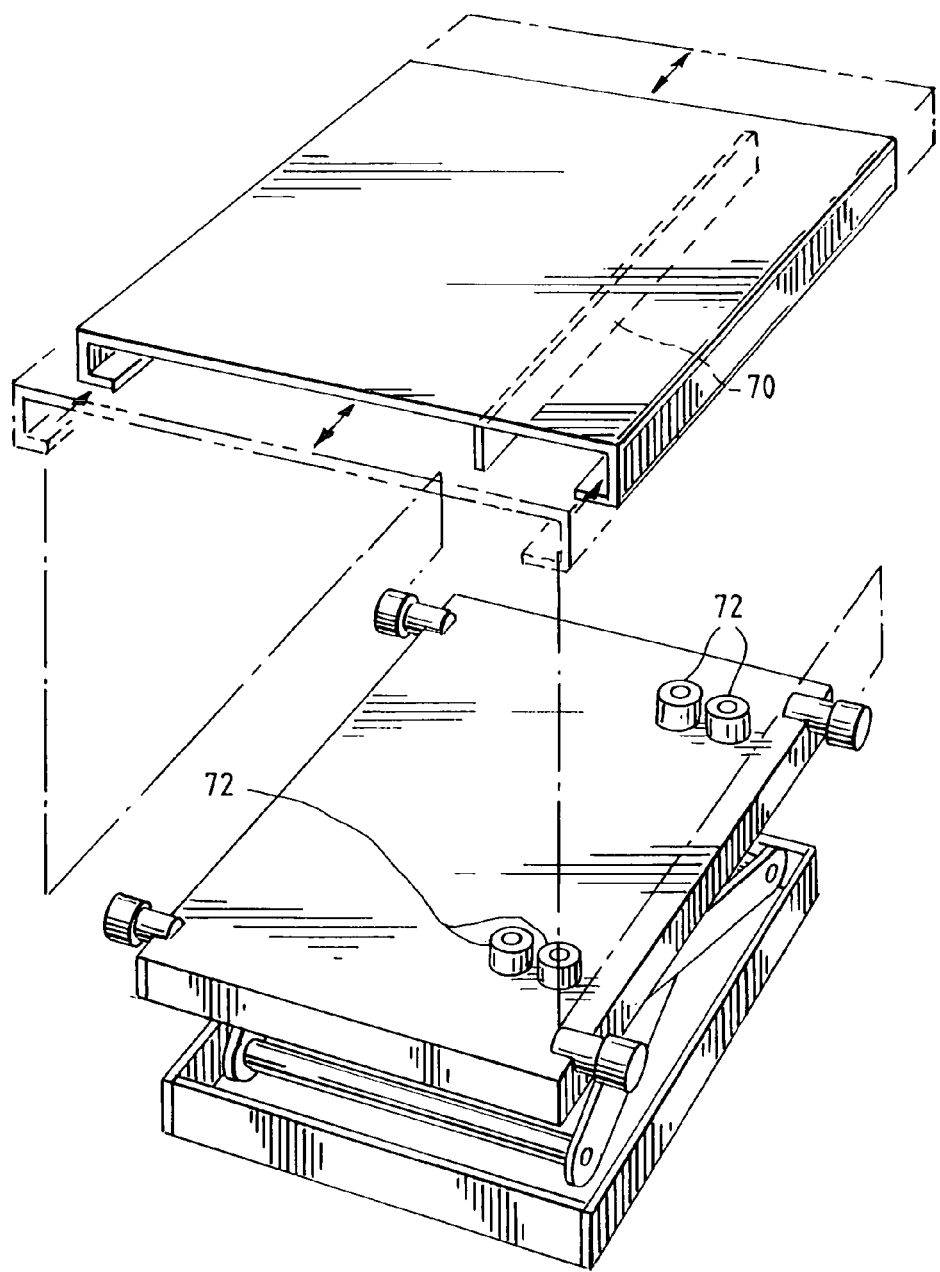
Figure 8:
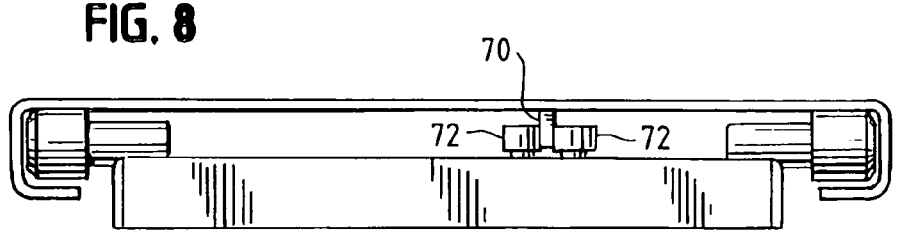

FIGS. 7 and 8 illustrate a further embodiment wherein the guide comprises a track 70 and the guide engaging member comprises a two pairs of rollers 72.

In each of these embodiments, those of skill in the art will appreciate that the guide and cooperating guide engaging members may be mounted to either of the base 12 or isolator 14.

In accordance with the operation of the present invention, the tolerances of the stabilizing system may be easily restricted while allowing wider tolerances for the rollers 26 and side tracks 32. In this way, the seat occupant will perceive a "tight" ride and canting of the isolator on the base will be eliminated. Moreover, any side loads transmitted to the seat suspension due to vehicle travel over uneven terrain, or otherwise, will be borne by the stabilizing system 16. This will reduce wear on the rollers 26 and side tracks 32, lengthening the service life of the suspension.

Although the preferred embodiments illustrate only a fore/aft isolator, the invention finds equal application with lateral isolators or suspensions employing both fore/aft and lateral isolators.

It will be appreciated by those skilled in the art that various changes and modifications can be made to the illustrated embodiments without departing from the spirit of the present invention. All such modifications and changes are intended to be covered by the appended claims.

We claim:

1. A vehicle seat suspension apparatus comprising:
   a base;
   an isolator disposed above the base and adapted to support a vehicle seat;
   means for allowing reciprocating horizontal movement of the isolator relative to the base, including at least one pair of isolator rollers disposed along a horizontal axis and received within cooperating horizontally extending tracks;

an elongated guide mounted to one of either the base or the isolator and oriented along the travel path of the isolator; and at least two spaced guide longitudinally aligned engaging members mounted to the other of the base or the isolator and engaging the guide at longitudinally spaced locations to stabilize the at least one pair of isolator rollers from horizontal movement perpendicular to the isolator travel path.

2. The vehicle seat suspension apparatus of claim 1 wherein the guide comprises at least one channel.

3. The vehicle seat suspension apparatus of claim 1, wherein the isolator is a fore and aft isolator.

4. The vehicle seat suspension apparatus of claim 1 wherein the isolator is a lateral isolator.

5. The vehicle seat suspension apparatus of claim 1 wherein the guide is an elongated rod and the guide engaging members are journal blocks.

6. A vehicle seat suspension apparatus comprising:

a base;

an isolator disposed above the base and adapted to support a vehicle seat;

means for allowing reciprocating horizontal movement of the isolator relative to the base, including at least one pair of isolator rollers disposed along a horizontal axis and received within cooperating horizontally extending tracks;

an elongated guide mounted to one of either the base or the isolator and oriented along the travel path of the isolator, said guide comprising two spaced and longitudinally aligned channels, one disposed adjacent one end of the base or isolator and the other disposed adjacent the other end of the base or isolator ; and two spaced guide engaging members mounted to the other of the base or the isolator and engaging the guide at spaced locations to stabilize the at least one pair of isolator rollers from horizontal movement perpendicular to the isolator travel path, said two guide engaging members each comprising a guide roller with one guide roller disposed in each of said channels.

7. A vehicle seat suspension apparatus comprising:

a base;

an isolator disposed above the base and adapted to support a vehicle seat;

means for allowing reciprocating horizontal movement of the isolator relative to the base, including at least one pair of isolator rollers disposed along a horizontal axis and received within cooperating horizontally extending tracks;

an elongated guide rail mounted to one of either the base or the isolator and oriented along the travel path of the isolator; and at least two spaced guide engaging members mounted to the other of the base or the isolator and engaging the guide at spaced locations to stabilize the at least one pair of isolator rollers from horizontal movement perpendicular to the isolator travel path, said at least two guide engaging members comprising two pairs of guide rollers, and wherein one guide roller of each pair is disposed on each side of the rail.

* * * * *

UNITED STATES PATENT AND TRADEMARK OFFICE
CERTIFICATE OF CORRECTION

PATENT NO. : 7,922,142 B2  
APPLICATION NO. : 10/879945  
DATED : April 12, 2011  
INVENTOR(S) : L. John Koutsky et al.

Page 1 of 1

It is certified that error appears in the above-identified patent and that said Letters Patent is hereby corrected as shown below:

Under the claims, specifically column 3, line 7, cancel the text "guide longitudinally aligned" and insert the following:

--and longitudinally aligned guide--

Signed and Sealed this
Ninth Day of August, 2011

David J. Kappos
*Director of the United States Patent and Trademark Office*